United States Patent Office 3,542,857
Patented Nov. 24, 1970

3,542,857
PRODUCTION OF VIC-GLYCOL ESTERS
Eugene F. Lutz, Concord, Calif., assignor to Shell Oil Company, New York, N.Y., a corporation of Delaware
No Drawing. Filed Feb. 20, 1968, Ser. No. 706,771
Int. Cl. C07c 67/04
U.S. Cl. 260—497                                   7 Claims

ABSTRACT OF THE DISCLOSURE

Olefins are oxidized to vic-glycol monoesters and diesters with molecular oxygen in an alkanoic acid medium in the presence of certain cerium salts as catalyst.

DESCRIPTION OF THE PRIOR ART

It is well known in the art that the oxidation of olefinic compounds with molecular oxygen is catalyzed by a variety of catalysts and that the nature of the oxidation products resulting therefrom is generally dependent upon the particular catalyst employed. For example, Naylor, British Pat. 904,304, issued Aug. 29, 1962, found that the oxidation of lower hydrocarbon α-olefins with molecular oxygen in the presence of a catalytic system consisting of a manganese salt and hydrobromic acid produces α,β-ethylenically unsaturated carboxylic acid products in which the olefinic double bond remains intact. From this finding and apparently several olefin oxidations in the absence of hydrobromic acid, Naylor alleged that a vast number of salts of metals, such as mercury, copper, lead, titanium, zirconium, cerium, tin, thorium, vanadium, columbrium, antimony, tantalum, bismuth, chromium, molybdenum, tungsten, uranium, iron, cobalt, nickel, ruthenium, rhodium, paladium, platinum, iridium and osmium, would in the additional presence of hydrobromic acid catalyze the oxidation of olefins to α,β-ethylenically unsaturated carboxylic acid products in the same manner as a manganese salt. However, Naylor later, in U.S. 3,271,447, issued Sept. 6, 1966, discloses that the only actual equivalent to manganese for effecting the oxidation of an α-olefin to an α, β-ethylenically unsaturated carboxylic acid product are nickel salts and that other metal salts are not operable.

SUMMARY OF THE INVENTION

It has now been found that the oxidation of olefinic compounds with molecular oxygen in the presence of a lower monocarboxylic alkanoic acid and in the presence of certain cerium salts as catalysts produces a mixture of vic-glycol monoesters and diesters. By way of illustration the oxidation of 1-octene with oxygen in acetic acid in the presence of cerium acetate as catalyst produces 1,2-diacetoxyoctane and 1-acetoxy-2-hydroxyoctane as major products.

DESCRIPTION OF THE PREFERRED EMBODIMENTS

The olefinic reactant

The process of the invention is generally applicable to any aliphatic hydrocarbon monoolefin wherein each carbon atom which is a member of the carbon-carbon double bond has at least one hydrogen substituent, that is, each carbon atom which is a member of the ethylenic linkage is primary or secondary. One class of suitable monoolefins is acyclic hydrocarbon monolefins of from 2 to 20 carbon atoms, preferably of from 2 to 12, and is represented by the Formula I

RCH=CHR    (I)

wherein R independently is hydrogen or is alkyl of up to 18 carbon atoms, preferably of up to 10 carbon atoms.

R is therefore hydrogen, methyl, ethyl, propyl, isopropyl, butyl, isobutyl, n-pentyl, n-hexyl, 2-methylhexyl, n-heptyl, 4-methylheptyl, n-octyl, n-decyl, n-tetradecane, n-octadecane or the like.

Illustrative of monoolefins of Formula I are ethylene, propylene, 1-butene, 2-butene, 1-pentene, 3-hexene, 4-methyl-1-heptene, 2-decene, 6-dodecene, 3-tetradecene and 10-eicosene. In general, the preferred monoolefins are olefins wherein R is hydrogen or is normal (straight-chain) alkyl, e.g., normal terminal α-olefins such as ethylene, propylene, 1-butene, 1-pentene, 1-octene, 1-decene and 1-eicosene, and normal internal olefins such as 2-butene, 2-pentene, 3-hexene, 3-octene, 4-decene and 6-dodecene. Particularly preferred are normal terminal α-olefins.

The alkanoic acid

The process of the invention employs a monocarboxylic alkanoic acid in proportions at least equimolar to the olefinic reactant. Suitable alkanoic acids are those of up to 10 carbon atoms, although alkanoic acids from 2 to 6 carbon atoms such as acetic acid, propionic acid, butyric acid, isobutyric acid and hexanoic acid are preferred.

Since the alkanoic acids are excellent diluents or cosolvents for the reaction, it is preferred that they be used in molar excess to provide a liquid reaction medium. Generally, molar ratios of alkanoic acid to olefinic reactant of about 5:1 to about 100:1 are satisfactory with molar ratios of about 10:1 to about 50:1 being preferred.

The catalyst

The oxidation reaction is carried out in the presence of a cerium salt which is substantially soluble in the reaction medium. Although it is not desired to be bound by any particular theory, it is considered likely that the anions of any added cerium salt [Ce (III) or Ce (IV)] which is soluble in the alkanoic acid medium of the reaction are displaced by the alkanoate moieties of the added alkanoic acid to give a cerium alkanoate species. Accordingly, it is usually advantageous to introduce the cerium catalyst as a cerium alkanoate of up to 10 carbon atoms, preferably of from 2 to 6 carbon atoms in each alkanoate moiety, such as cerium acetate, cerium propionate, cerium butyrate, cerium hexanoate and the like. It is also often advantageous to employ compounds of cerium with other anions such as cerium chloride, cerium fluoride, cerium citrate, cerium nitrate, cerium sulfate and the like. Preferred cerium salts, however, are cerium alkanoates, especially cerium acetate.

The cerium salt is employed in molar ratios of cerium salt to olefin of from about 1:100 to about 1:100,000. Generally, the preferred molar ratio of cerium salt to olefin is from about 1:1000 to about 1:10,000.

The oxygen reactant

The form in which the molecular oxygen is introduced is not critical and oxygen is suitably charged as such or it is diluted with an inert gas such as nitrogen or argon. A particularly convenient form is molecular oxygen mixed with an inert gas diluent, especially nitrogen, e.g., air.

The reaction conditions

The process of the invention is conducted in liquid phase reaction medium. The presence of additional diluents is not required; however, it is often advantageous to provide in the reaction medium an organic diluent which is substantially chemically inert in the oxidative conditions of the reaction. Suitable organic diluents include aromatic hydrocarbons such as benzene and alkanoic acid anhydrides such as acetic anhydride, propionic anhydride and the like.

In some instances, it is useful to introduce into the reaction mixture as an initiator, a minor amount of a readily oxidizable material, such as methyl ethyl ketone, acetone, acrolein, or a reactive oxidizing agent such as ozone or a peroxide, e.g., benzoyl peroxide or t-butyl hydroperoxide, to initiate oxidation at a more rapid rate. No initiator is required, however, and even in instances where initiator was supplied initially, additional initiator is not required when reaction has begun.

The oxidation of the olefinic reactant is suitably conducted by a variety of procedures. In one modification, the olefinic reactant, alkanoic acid, cerium salt and any initiator or diluent employed are charged to an autoclave or similar pressure reactor and maintained at reaction conditions while oxygen is added in increments or continuously. In another modification, reaction is effected in a continuous operation as by contacting the entire amounts of reaction components during passage through a tubular reactor. In yet another modification, the entire amounts of reaction mixture components are contacted in a pressure reactor maintained at reaction temperature and pressure. In any modification, the reaction is most efficiently conducted at elevated temperatures and pressure. The reaction temperature suitably varies from about 50° C. to about 175° C. The temperature range from about 100° C. to about 150° C. is preferred. Suitable reactor pressures are those which serve to maintain a substantial part of the olefinic reactant and alkanoic acid in the liquid phase. Reactor pressures varying from 15 p.s.i.g. to about 2000 p.s.i.g. are generally satisfactory although pressures from about 25 p.s.i.g. to about 1000 p.s.i.g. are preferred. In general, molecular oxygen partial pressures vary from about 2 p.s.i.g. to about 500 p.s.i.g. with partial pressures of about 5 p.s.i.g to about 300 p.s.i.g. being preferred. Inert gas diluents such as nitrogen or argon are employed to maintain the desired reactor pressure.

Subsequent to reaction, the reaction mixture is separated and the desired products are recovered by conventional methods such as fractional distillation, selective extraction, chromatographic techniques and the like.

The products

Vic-glycol monoesters and diesters are the major products of the process of the invention and are represented by the Formula II:

wherein the term R has the previously stated significance and R' independently is hydrogen or an alkanoyl moiety corresponding to the alganoic acid reactant. By way of illustration the reaction of 2-octene in propionic acid in accordance with the process of the invention gives a product mixture comprising as major products 2,3-dipropionoyloxyoctane, 2 - hydroxy - 3 - propionoyloxyoctane and 3-hydroxy-2-propionoyloxyoctane. Similarly, reaction of 1-butene in propionic acid in accordance with the process of the invention produces 1,2-dipropionoyloxybutane, 1-hydroxy-2-propionoyloxybutane and 2 - hydroxy - 1 - propionoyloxybutane. Generally, in the case of α-olefins such as 1-butene, the predominate monohydroxy product is the one wherein the hydroxy group is secondary, e.g., 2-hydroxy-1-propionoyloxybutane.

The products of the invention are of established utility in a variety of applications as a mixture or separated into individual components. The vic-glycol diesters are useful as plasticizers for vinyl polymers, e.g., as disclosed by Swiss 237,401 of Staeger, issued Jan. 16, 1946. The products can be hydrolyzed with base to produce the corresponding vic-glycol compounds, e.g., butanediols, which can be converted to cyclic carbonates useful as motor oil additives as disclosed by U.S. 2,939,774 of Oberdorfer, issued June 7, 1960, or to polyesters by reaction with dibasic acids such as adipic acid by the procedure disclosed by German Pat. 900,495 of Batzer et al., issued Dec. 28, 1953. The vic-glycol compounds, e.g., propylene glycol, are also useful in antifreeze compositions as disclosed by German Pat. 1,037,203 of Friedrich, issued Aug. 21, 1958.

To further illustrate the improved process of the invention, the following examples are provided. It should be understood that the details thereof are not to be regarded as limitations as they may be varied as will be understood by one skilled in the art.

EXAMPLE I

The oxidation of 1-octene with molecular oxygen was conducted in a series of runs in the presence of acetic acid and a variety of cerium salts. In a typical run, a mixture of a sample of the indicated cerium salt, 0.1 mole of 1-octene, 150 ml. of acetic acid, and 0.05 mole of methyl ethyl ketone was charged to a glass pressure reactor and heated at the indicated temperature for the indicated period of time while oxygen was bubbled into the mixture at a rate of 110 cc./min. The resulting reaction mixture was then separated by distillation or selective extraction and analyzed by gas chromatographic techniques. The cerium salt employed, reaction conditions, conversion of 1-octene and selectivities to glycol ester products are provided in Table I.

TABLE I.—1-OCTENE OXIDATION

| Run | Catalyst | Moles | Temp., °C. | Time, hrs. | 1-octene conv., percent | Selectivity | | |
|---|---|---|---|---|---|---|---|---|
| | | | | | | $C_6H_{13}CHCH_2OAc$ $\mid$ $OAc$ | $C_6H_{13}CHCH_2OH$ and $C_6H_{13}CHCH_2OAc$ $\mid$ $OAc$ | $\mid$ $OH$ |
| 1 | Ce(OAc)₃ | 0.003 | 135 | 7 | 11.9 | 61.9 | | 6.1 |
| 2 | Ce(OAc)₃ | 0.0015 | 138 | 7 | 14.7 | 65.1 | | 5.9 |
| 3 | Ce(OAc)₃ | 0.0008 | 135 | 6 | 20.8 | 63.5 | | 11.0 |
| 4 | Ce(NO₃)₃ | 0.006 | 135 | 7 | 30.2 | 39.6 | | 6.5 |
| 5 | Ce(Cl)₃ | 0.006 | 130 | 7 | 6.0 | 15.7 | | 1.9 |
| 6 | Ce(HSO₄)₄ | 0.0008 | 135 | 6 | 23.7 | 38.9 | | 5.4 |

EXAMPLE II

A mixture of 0.17 g. of cerous acetate, 100 ml. of acetic acid, 10 g. of propylene, 250 p.s.i.g. of oxygen and 275 p.s.i.g. of nitrogen was charged to a glass-lined magnadrive autoclave and heated to a temperature of 135–143° C. for 7 hours. Separation of the resulting reaction mixture and analysis by gas chromatographic techniques showed a 10.8% conversion of propylene to a product mixture comprised of 29.3% wt. of 1,2-diacetoxypropane and 43.0% wt. of 2-hydroxy-1-acetoxypropane.

EXAMPLE III

By a procedure similar to that of Example II, ethylene was converted to a product mixture comprised of 1,2-diacetoxyethane and 1-acetoxy-2-hydroxyethane.

I claim as my invention:

1. The process of producing a vic-glycol ester product by intimately contacting a monoolefin of from 2 to 20 carbon atoms represented by the formula

wherein R independently is hydrogen or is alkyl of up to 18 carbon atoms with molecular oxygen in the presence of a monocarboxylic alkanoic acid of up to 10 carbon atoms, the molar ratio of alkanoic acid to olefin being from about 5:1 to about 100:1, in the presence of a cerium salt which is substantially soluble in the alkanoic acid and is present in a molar ratio relative to the olefin of from about 1:100 to about 1:100,000, at a temperature of from about 50° C. to about 175° C.

2. The process of claim 1 wherein the monocarboxylic acid has from 2 to 6 carbon atoms.

3. The process of claim 2 wherein the cerium salt is a cerium alkanoate of from 2 to 6 carbon atoms.

4. The process of claim 3 wherein RCH=CHR is normal, straight-chain monoolefin.

5. The process of claim 4 wherein RCH=CHR is normal, straight-chain terminal α-olefin.

6. The process of claim 3 wherein the alkanoate moiety of each of the cerium alkanoate and the alkanoic acid is acetate.

7. The process of claim 1 wherein the cerium salt is cerium nitrate.

References Cited

FOREIGN PATENTS 904,304   8/1962   Great Britain.

LORRAINE A. WEINBERGER, Primary Examiner

V. GARNER, Assistant Examiner

U.S. Cl. X.R.

260—31.6, 410.6, 485, 635